(12) United States Patent
Shimezawa et al.

(10) Patent No.: US 9,538,397 B2
(45) Date of Patent: Jan. 3, 2017

(54) BASE STATION, TERMINAL, COMMUNICATION SYSTEM, COMMUNICATION METHOD, AND INTEGRATED CIRCUIT

(75) Inventors: Kazuyuki Shimezawa, Osaka (JP); Kimihiko Imamura, Osaka (JP); Toshizo Nogami, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 130 days.

(21) Appl. No.: 14/006,830

(22) PCT Filed: Mar. 14, 2012

(86) PCT No.: PCT/JP2012/056526
§ 371 (c)(1),
(2), (4) Date: Sep. 23, 2013

(87) PCT Pub. No.: WO2012/128141
PCT Pub. Date: Sep. 27, 2012

(65) Prior Publication Data
US 2014/0016556 A1    Jan. 16, 2014

(30) Foreign Application Priority Data
Mar. 24, 2011    (JP) .................................. 2011-065443

(51) Int. Cl.
*H04W 24/02*    (2009.01)
*H04L 5/00*    (2006.01)
(Continued)

(52) U.S. Cl.
CPC ............ *H04W 24/02* (2013.01); *H04L 5/0016* (2013.01); *H04L 5/0035* (2013.01); *H04L 5/0048* (2013.01);
(Continued)

(58) Field of Classification Search
CPC ... H04W 24/02; H04W 72/042; H04L 5/0016; H04L 27/2613; H04L 5/0053; H04L 25/03866; H04L 5/0048; H04L 5/0035; H04L 25/0024
(Continued)

(56) References Cited

U.S. PATENT DOCUMENTS

2011/0103250 A1*    5/2011    Li ....................... H04W 76/046
370/252
2012/0033540 A1*    2/2012    Kim et al. .................... 370/203
(Continued)

FOREIGN PATENT DOCUMENTS

WO    2011/021827 A2    2/2011
WO    2011/021852 A2    2/2011

OTHER PUBLICATIONS

Official Communication issued in International Patent Application No. PCT/JP2012/056526, mailed on May 22, 2012.
(Continued)

*Primary Examiner* — Mohammad Anwar
(74) *Attorney, Agent, or Firm* — Keating & Bennett, LLP

(57) ABSTRACT

A base station is provided in which a terminal efficiently controls a demodulation reference signal for a data signal transmitted from the base station in a wireless communication system in which the base station and the terminal communicates with each other. The base station that performs a communication with the terminal includes a data signal generation unit that generates a data signal for terminal, and a demodulation reference signal for a data signal multiplexing unit that multiplexes a demodulation reference signal for a data signal, which is a known signal for demodulating the data signal, into the data signal. The scramble code included in the demodulation reference signal for the data signal is generated based on a first scramble ID and a second scramble ID that are notified from the base station to the terminal.

8 Claims, 10 Drawing Sheets

(51) Int. Cl.
*H04L 25/03* (2006.01)
*H04W 72/04* (2009.01)
*H04L 27/26* (2006.01)
*H04L 25/02* (2006.01)

(52) U.S. Cl.
CPC ....... *H04L 5/0053* (2013.01); *H04L 25/03866* (2013.01); *H04L 27/2613* (2013.01); *H04W 72/042* (2013.01); *H04L 25/0224* (2013.01)

(58) Field of Classification Search
USPC .................................................. 370/328, 338
See application file for complete search history.

(56) References Cited

U.S. PATENT DOCUMENTS

| | | | |
|---|---|---|---|
| 2012/0176884 A1* | 7/2012 | Zhang .................... | H04B 7/024 370/203 |
| 2013/0039284 A1* | 2/2013 | Marinier ................ | H04L 5/001 370/329 |
| 2013/0194931 A1* | 8/2013 | Lee et al. ..................... | 370/241 |
| 2014/0092829 A1* | 4/2014 | Han et al. ..................... | 370/329 |

OTHER PUBLICATIONS

3GPP TS 36. 213 V10.0.1, "3rd Generation Partnership Project; Technical Specification Group Radio Access Network; Evolved Universal Terrestrial Radio Access (E-UTRA); Physical layer procedures (Release 10)", Dec. 2010, 98 pages.

3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)", Mar. 2010; 104 pages.

NTT Docomo, "CoMP with Lower Tx Power RRH in Heterogeneous Network", 3GPP TSG-RAN WG1 #64, R1-110867, Feb. 15, 2011, pp. 1-8.

Panasonic, "DMRS Port Indication with MU-MIMO Considerations", 3GPP TSG-RAN WG1 #60, R1-101264, Feb. 16, 2010, pp. 1-5.

Panasonic, "DCI Formats for R-PDCCH", 3GPP TSG-RAN WG1 #61, R1-102882, May 4, 2010, pp. 1-3.

* cited by examiner

| ANTENNA PORT NUMBER | [ $\overline{w}_p(0)$ $\overline{w}_p(1)$ $\overline{w}_p(2)$ $\overline{w}_p(3)$ ] |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

FIG.8

| ONE CODE WORD: CODE WORD 0 enabled, CODE WORD 1 disabled | |
|---|---|
| VALUE (STATE) | MESSAGE |
| 0 | 1 layer, port 7, $n_{SCID}=0$ |
| 1 | 1 layer, port 7, $n_{SCID}=1$ |
| 2 | 1 layer, port 8, $n_{SCID}=0$ |
| 3 | 1 layer, port 8, $n_{SCID}=1$ |
| 4 | 2 layers, port 7-8, $n_{SCID}=0$ |
| 5 | 2 layers, port 7-8, $n_{SCID}=1$ |
| 6 | 3 layers, port 7-9 |
| 7 | 4 layers, port 7-10 |

FIG.9

| ONE CODE WORD: CODE WORD 0 enabled, CODE WORD 1 disabled | |
|---|---|
| VALUE (STATE) | MESSAGE |
| 0 | 1 layer, port 7, $n_{SCID}=0$ |
| 1 | 1 layer, port 7, $n_{SCID}=1$ |
| 2 | 1 layer, port 7, $n_{SCID}=2$ |
| 3 | 1 layer, port 7, $n_{SCID}=3$ |
| 4 | 1 layer, port 8, $n_{SCID}=0$ |
| 5 | 1 layer, port 8, $n_{SCID}=1$ |
| 6 | 2 layers, port 7-8, $n_{SCID}=0$ |
| 7 | 2 layers, port 7-8, $n_{SCID}=1$ |

FIG.10

| TWO CODE WORDS: CODE WORD 0 enabled, CODE WORD 1 disabled | |
|---|---|
| VALUE (STATE) | MESSAGE |
| 0 | 2 layers, port 7-8, $n_{SCID}=0$ |
| 1 | 2 layers, port 7-8, $n_{SCID}=1$ |
| 2 | 2 layers, port 7-8, $n_{SCID}=2$ |
| 3 | 2 layers, port 7-8, $n_{SCID}=3$ |
| 4 | 3 layers, port 7-9, $n_{SCID}=0$ |
| 5 | 3 layers, port 7-9, $n_{SCID}=1$ |
| 6 | 4 layers, port 7-10, $n_{SCID}=0$ |
| 7 | 4 layers, port 7-10, $n_{SCID}=1$ |

FIG.11

| VALUE (STATE) | TWO CODE WORDS: CODE WORD 0 enabled, CODE WORD 1 disabled |
|---|---|
| | MESSAGE |
| 0 | 2 layers, port 7-8, $n_{SCID}=0$ |
| 1 | 2 layers, port 7-8, $n_{SCID}=1$ |
| 2 | 3 layers, port 7-9, $n_{SCID}=0$ |
| 3 | 3 layers, port 7-9, $n_{SCID}=1$ |
| 4 | 4 layers, port 7-10, $n_{SCID}=0$ |
| 5 | 4 layers, port 7-10, $n_{SCID}=1$ |
| 6 | 5 layers, port 7-11 |
| 7 | 6 layers, port 7-12 |
| 8 | 7 layers, port 7-13 |
| 9 | 8 layers, port 7-14 |
| 10-15 | Reserved |

BASE STATION, TERMINAL, COMMUNICATION SYSTEM, COMMUNICATION METHOD, AND INTEGRATED CIRCUIT

TECHNICAL FIELD

The present invention relates to a base station, a terminal, a communication system, a communication method, and an integrated circuit.

BACKGROUND ART

In a wireless communication system such as a Wideband Code Division Multiple Access (WCDMA) by Third Generation Partnership Project (3GPP), a Long Term Evolution (LTE), a LTE-Advanced (LTE-A), a Wireless LAN by The Institute of electrical and Electronics engineers (IEEE), and Worldwide Interoperability for Microwave Access (Wi-MAX), a base station (a cell, a transmission station, a transmission device, and an eNodeB) and a terminal (a mobile terminal, a reception station, a mobile station, a reception device, and a User Equipment (UE)) respectively include a plurality of transmitting-receiving antennas, thereby it is possible to realize high-speed data transmission by a Multi Input Multi Output (MIMO) technology.

In such a wireless communication system, a channel state between the base station and the terminal is measured by using a reference signal for measuring the channel state (Channel State Information-Reference Signal (CSI-RS), a pilot signal, a known signal) configured by signals that are commonly known between the base station and the terminal. Further, in the wireless communication system, a Modulation and Coding Scheme (MCS), a spatial multiplexing number (number of layers and rank number), a precoding weight (precoding matrix and precoder), and the like are adaptively controlled based on the measured result, thereby it is possible to realize more efficient data transmission.

Further, in a case where the base station transmits data signals to the terminal, demodulation reference signal for the data signal (Demodulation Reference Signal (DMRS) and UE-specific RS) configured by the signals that are commonly known between the base station and the terminal are multiplexed and transmitted. The demodulation reference signal for the data signal may be multiplexed into the data signal, prior to performing a precoding process with respect to the terminal. Therefore, the terminal may measure the precoding process performed by the base station and equalization channel including a channel state, by using the demodulation reference signal for the data signal. For example, a method described in NPL 1 may be used. Accordingly, the terminal may perform a demodulation process of the data signals transmitted by the base station, even without knowing the precoding process performed by the base station.

On the other hand, it is possible to build a wireless communication system using a heterogeneous network configuration by a macro base station having wide coverage and an RRC (Remote Radio Head) having narrower coverage than the macro base station. FIG. 13 is a schematic diagram of the wireless communication system using the heterogeneous network configuration. In an example shown in FIG. 13, the heterogeneous network configuration is formed by a macro base station 1301, an RRC 1302, and an RRC 1303. The macro base station 1301 builds coverage 1305, and the RRH 1302 and the RRH 1303 respectively build coverage 1306 and coverage 1307. Further, the macro base station 1301 is connected to the RRH 1302 through a line 1308, and connected to the RRH 1303 through a line 1309. Thus, the macro base station 1301 may transmit and receive a control signal and a data signal with the RRH 1302 and the RRH 1303. The line 1308 and the line 1309 may use a wire line such as an optical fiber or a wireless line using a relay technology. In this case, all or a part of the macro base station 1301, the RRH 1302, and the RRH 1303 respectively use the same frequency (resource), thereby it is possible to improve an overall frequency usage efficiency (transmission capacity) within an area of the coverage 1305.

When the terminal 1304 is located within the coverage 1306, the terminal 1304 may perform a single cell communication with the RRH 1302. Further, when the terminal 1304 is located around the edge (cell edge) of the coverage 1306, it is necessary to take measures against co-channel interference from the macro base station 1301. A method is considered which reduces or suppresses the interference to the terminal 1304 in a cell edge area, by performing an inter-base station cooperative communication in which adjacent base stations cooperate with each other, as a multi-cell communication (cooperative communication) between the macro base station 1301 and the RRH 1302. For example, in NPL 2, a Cooperative Multipoint (CoMP) transmission scheme is considered as such a scheme.

CITATION LIST

Non Patent Literature

NPL 1: $3^{rd}$ Generation Partnership Project; Technical Specification Group Radio Access Network; Evolved Universal Terrestrial Radio Access (E-UTRA); physical layer procedures (Release 10), December, 2010, 3GPP TS 36. 213 V10. 0. 1 (2010-12)

NPL 2: $3^{rd}$ Generation Partnership Project; Technical Specification Group Radio Access Network; Further Advancements for E-UTRA Physical Layer Aspects (Release 9), March, 2010, 3GPP TR 36. 814 V9. 0. 0 (2010-03)

SUMMARY OF INVENTION

Technical Problem

However, in the wireless communication system that may perform a cooperative communication, when the demodulation reference signal for the data signals to be transmitted to respective different terminals are the same, a plurality of base stations may interfere with each other. This deteriorates quality of the demodulation reference signal for the data signals received by respective terminals, and hence becomes a factor that impedes the transmission efficiency.

The present invention is made in view of the above-described problems, and an object thereof is to provide a base station, a terminal, a communication system, a communication method, and an integrated circuit, in which the terminal can efficiently control a demodulation reference signal for a data signal transmitted from the base station, in a wireless communication system in which the base station and the terminal communicate with each other.

Solution to Problem (1) The present invention is made for solving the above-described problems, and a base station according to an aspect of the present invention communicates with a terminal. The base station includes a data signal generation unit that generates a data signal for terminal, and a demodulation reference signal for a data signal multiplexing unit that multiplexes a demodulation reference signal for a data signal, which is a known signal for demodulating the data signal, into the data signal. A scramble code included in the demodulation reference signal for the data signal is generated based on a first scramble ID and a second scramble ID that are notified from the base station to the terminal.

(2) Preferably, the first scramble ID is control information to be notified through a PDCCH signaling capable of dynamically notifying control information. The second scramble ID is any one of a plurality of parameters to be notified through a RRC signaling capable of quasi-statically notifying control information.

(3) Preferably, the second scramble ID is set by control information that is different from the first scramble ID to be notified through the PDCCH signaling, among the plurality of parameters.

(4) Preferably, the second scramble ID is set by the first scramble ID, among the plurality of parameters.

(5) Preferably, the data signal is control information to be notified using a resource that is different from the control information to be notified through the PDCCH signaling.

(6) Preferably, the first scramble ID or the second scramble ID are notified through the RRC signaling.

(7) Further, a terminal according to another aspect of the present invention communicates with a base station. The terminal includes a reception signal processing unit that performs reception processes of a data signal for a terminal transmitted from the base station and a demodulation reference signal for a data signal which is a known signal for demodulating the data signal, and a channel estimation unit that estimates a channel state for demodulating the data signal, using the demodulation reference signal for the data signal. A scramble code included in the demodulation reference signal for the data signal is generated based on a first scramble ID and a second scramble ID that are notified from the base station to the terminal.

(8) Further, in a communication system according to still another aspect of the present invention, a terminal and a base station communicate with each other. The base station includes a data signal generation unit that generates a data signal for terminal, and a demodulation reference signal for a data signal multiplexing unit that multiplexes a demodulation reference signal for a data signal, which is a known signal for demodulating the data signal, into the data signal. The terminal includes a reception signal processing unit that performs reception processes of a data signal for a terminal transmitted from the base station and a demodulation reference signal for a data signal which is a known signal for demodulating the data signal, and a channel estimation unit that estimates a channel state for demodulating the data signal, using the demodulation reference signal for the data signal. A scramble code included in the demodulation reference signal for the data signal is generated based on a first scramble ID and a second scramble ID that are notified from the base station to the terminal.

(9) Further, a communication method according to still another aspect of the present invention is executed in a base station that communicates with a terminal. The communication method includes a step of generating a data signal for terminal, and a step of multiplexing a demodulation reference signal for a data signal, which is a known signal for demodulating the data signal, into the data signal. A scramble code included in the demodulation reference signal for the data signal is generated based on a first scramble ID and a second scramble ID that are notified from the base station to the terminal.

(10) Further, a communication method according to still another aspect of the present invention is executed in a terminal that communicates with a base station. The communication method includes a step of performing reception processes of a data signal for terminal transmitted from the base station and a demodulation reference signal for a data signal which is a known signal for demodulating the data signal, and a step of estimating a channel state for demodulating the data signal, using the demodulation reference signal for the data signal. A scramble code included in the demodulation reference signal for the data signal is generated based on a first scramble ID and a second scramble ID that are notified from the base station to the terminal.

(11) Further, an integrated circuit according to still another aspect of the present invention is used in a base station that communicates with a terminal. The integrated circuit realizes a function of generating a data signal for terminal, and a function of multiplexing a demodulation reference signal for a data signal, which is a known signal for demodulating the data signal, into the data signal. A scramble code included in the demodulation reference signal for the data signal is generated based on a first scramble ID and a second scramble ID that are notified from the base station to the terminal.

(12) Further, an integrated circuit according to still another aspect of the present invention is used in a terminal that communicates with a base station. The integrated circuit realizes a function of performing reception processes of a data signal for terminal transmitted from the base station and a demodulation reference signal for a data signal which is a known signal for demodulating the data signal, and a function of estimating a channel state for demodulating the data signal, using the demodulation reference signal for the data signal. A scramble code included in the demodulation reference signal for the data signal is generated based on a first scramble ID and a second scramble ID that are notified from the base station to the terminal.

Advantageous Effects of Invention

According to the present invention, it is possible to efficiently control a demodulation reference signal for a data signal transmitted from a base station, in a wireless communication system in which the base station and a terminal communicate with each other.

BRIEF DESCRIPTION OF DRAWINGS

FIG. 8 a diagram illustrating is an example of control information for setting a demodulation reference signal for a data signal by one code word.

FIG. 9 is a diagram illustrating another example of control information for setting a demodulation reference signal for a data signal by one code word.

FIG. 10 is a diagram illustrating an example of control information for setting a demodulation reference signal for a data signal by two code words.

FIG. 11 is a diagram illustrating another example of control information for setting a demodulation reference signal for a data signal by two code words.

DESCRIPTION OF EMBODIMENTS

[First Embodiment]

Hereinafter, a first embodiment of the present invention will be described. The communication system in the first embodiment includes a primary base station (a macro base station, a first base station, a first communication device, a serving base station, an anchor base station, and a first component carrier) and a secondary base station (an RRC, a pico base station, a femto base station, a Home eNodeB, a second base station device, a cooperative base station group, a cooperative base station set, a second communication device, a cooperative base station, and a second component carrier), as a base station (a transmission device, a cell, a transmission point, a transmission antenna group, a transmission antenna port group, a component carrier, and an eNodeB). Further, the communication system in the first embodiment includes a terminal (a terminal device, a mobile terminal, a reception point, a reception terminal, a reception device, a third communication device, a reception antenna group, a reception antenna port group, and a UE). In addition, a plurality of secondary base stations may exist. Further, the primary base station and the secondary base station use the heterogeneous network configuration. An entirety or a part of the coverage of the secondary base station is included in the coverage of the primary base station, and thus a multi-cell communication and a single cell communication may be performed with respect to the terminal. Hereinafter, a case is considered in which the primary base station and the secondary base station perform a communication using resources (resource block) in the same frequency.

Figure 1:
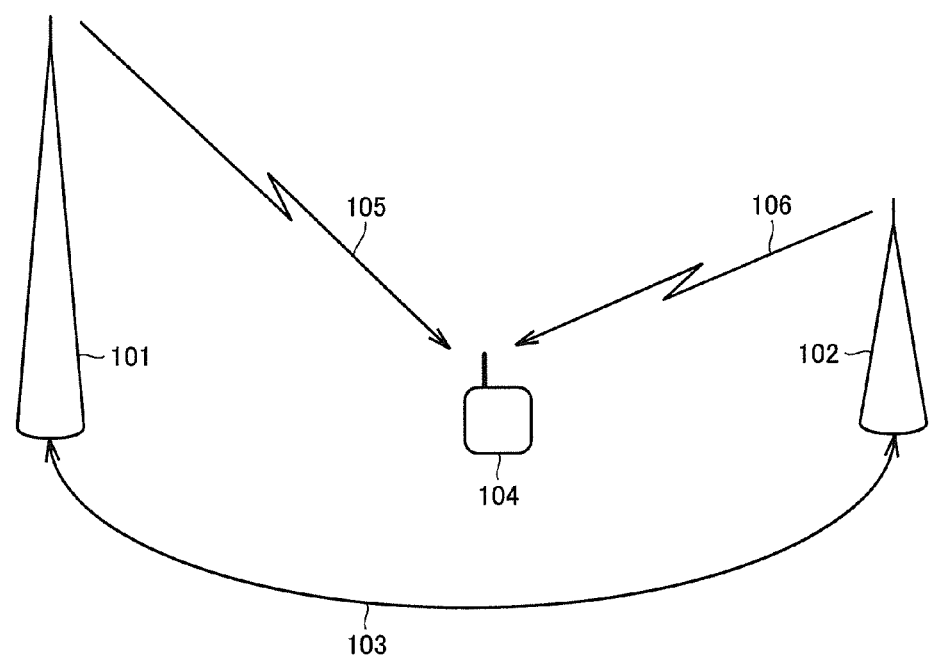
FIG. 1 is a schematic diagram illustrating an example of performing a multi-cell communication in a wireless communication system using a heterogeneous network configuration according to a first embodiment of the present invention.

FIG. 1 is a schematic diagram illustrating an example of performing a multi-cell communication in a wireless communication system using a heterogeneous network configuration according to a first embodiment of the present invention. In FIG. 1, a terminal 104 is located in a cell edge area (a boundary area) of a secondary base station 102, and performs a multi-cell communication from a primary base station 101 and the secondary base station 102.

Here, the multi-cell communication means that a plurality of base stations cooperate with each other to communicate signals such as data signals and control signals with respect to the terminal. For example, a CoMP communication is included in the multi-cell communication. Specifically, the multi-cell communication includes a Joint transmission (a Joint processing) of transmitting the same signal from a plurality of base stations to the terminal, a Dynamic cell selection of dynamically switching a base station that transmits signals to the terminal, Coordinated Beamforming in which base stations cooperate and perform Beamforming to reduce interference from each other, a coordinated scheduling in which base stations cooperate and perform a scheduling to reduce interference from each other, and the like.

FIG. 1 illustrates a case of performing the joint transmission as an example thereof. The terminal 104 receives data signals addressed to the terminal 104 through a downlink 105 between the primary base station 101 and the terminal 104 and a downlink 106 between the secondary base station 102 and the terminal 104. Further, a demodulation reference signal for a data signal is multiplexed into the data signal addressed to the terminal 104. In this case, it is preferable that the demodulation reference signal for the data signal transmitted by the primary base station 101 and the demodulation reference signal for the data signal transmitted by the secondary base station 102 be the same.

Figure 2:
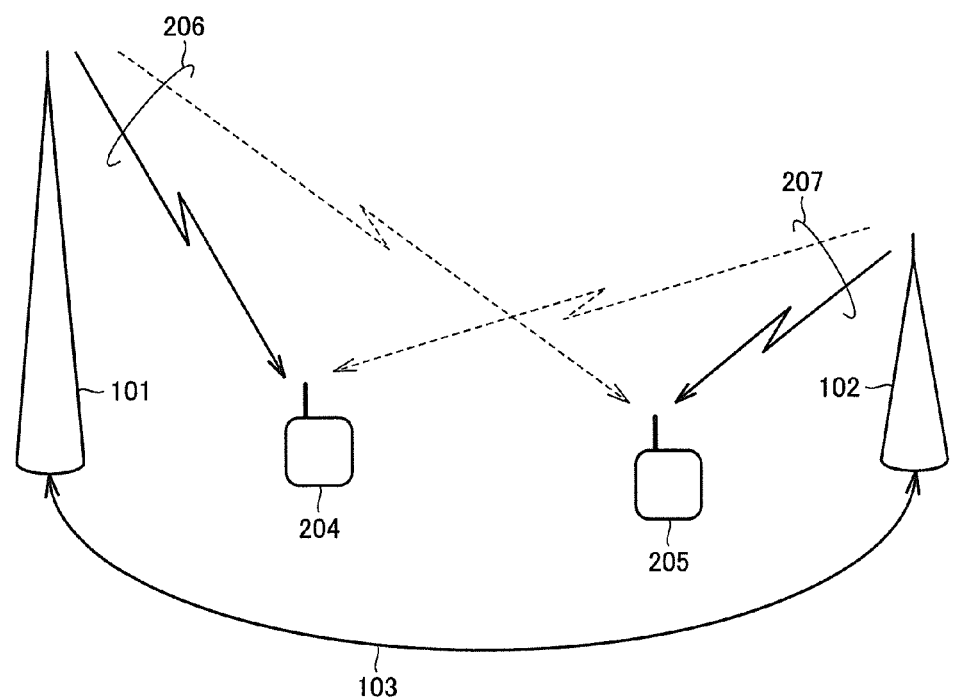
FIG. 2 is a schematic diagram illustrating an example of performing a single-cell communication in the wireless communication system using the heterogeneous network configuration according to the first embodiment of the present invention.

FIG. 2 is a schematic diagram illustrating an example of performing a single-cell communication in the wireless communication system using the heterogeneous network configuration according to the first embodiment of the present invention. In FIG. 2, the terminal 204 performs a single cell communication from the primary base station 101 and the terminal 205 performs a single cell communication from the secondary base station 102. The primary base station 101 multiplexes the demodulation reference signal for the data signal into the data signal addressed to the terminal 204, and transmits the multiplexed signal through a downlink 206. The secondary base station 102 multiplexes the demodulation reference signal for the data signal into the data signal addressed to the terminal 205, and transmits the multiplexed signal through a downlink 207.

Here, the single cell communication means that a single base station communicates signals such as a data signal and a control signal with respect to the terminal. In the single cell communication, for example, a communication method included in a transmission mode of the related art defined in a communication system with backwards compatibility is used.

Further, in a case where the signal addressed to the terminal 204 and the signal addressed to the terminal 205 are transmitted by using resources (resource blocks) in the same frequency region and the same time region, the signals become co-channel interference to each other. In other words, the signal transmitted through the downlink 206 interferes in the terminal 205, and the signal transmitted through the downlink 207 interferes in the terminal 204. Here, since the signal addressed to the terminal 204 and the signal addressed to the terminal 205 are generally different, the correlation therebetween becomes small. Therefore, the terminal 204 and the terminal 205 can handle the data signals that respectively become interference, as a white noise. However, in a case where the demodulation reference signal for the data signal multiplexed into the data signal addressed to the terminal 204 and the demodulation reference signal for the data signal multiplexed into the data signal addressed to the terminal 205 are the same, the correlation therebetween increases. In the terminal 204 and the terminal 205, an estimation accuracy of a channel state for demodulating each data signal is significantly deteriorated. For this reason, it is preferable that the demodulation reference signal for the data signal transmitted by the primary base station 101 and the demodulation reference signal for the data signal transmitted by the secondary base station 102 be different.

In addition, each base station can perform an adaptive control on the data signal transmitted to each terminal, according to a channel state of each downlink. The primary base station 101 and the secondary base station 102 transmit each unique reference signal for measuring a channel state to each base station. Each terminal estimates the channel state of the downlink by using all or a part of the demodulation reference signals for measuring channel states of the primary base station 101 and secondary base station 102. Each terminal generates information (feedback information) for performing the adaptive control, based on the estimated channel state. Each terminal transmits the feedback information to the primary base station 101 or the secondary base station 102, using an upper link. In a case where the secondary base station 102 receives the feedback information, the secondary base station 102 transmits the feedback information to the primary base station 101 through a line (X2 interface) 103 using an optical fiber and a relay technology. The primary base station 101 performs the adaptive control and the scheduling of the data signal for each terminal, based on the feedback information from each terminal to generate control information. The primary base station 101 transmits the control information to the secondary base station 102 through the line 103. Based on the control information, the primary base station 101 and the secondary base station 102 perform the multi-cell communication or the single-cell communication with each terminal.

Figure 3:
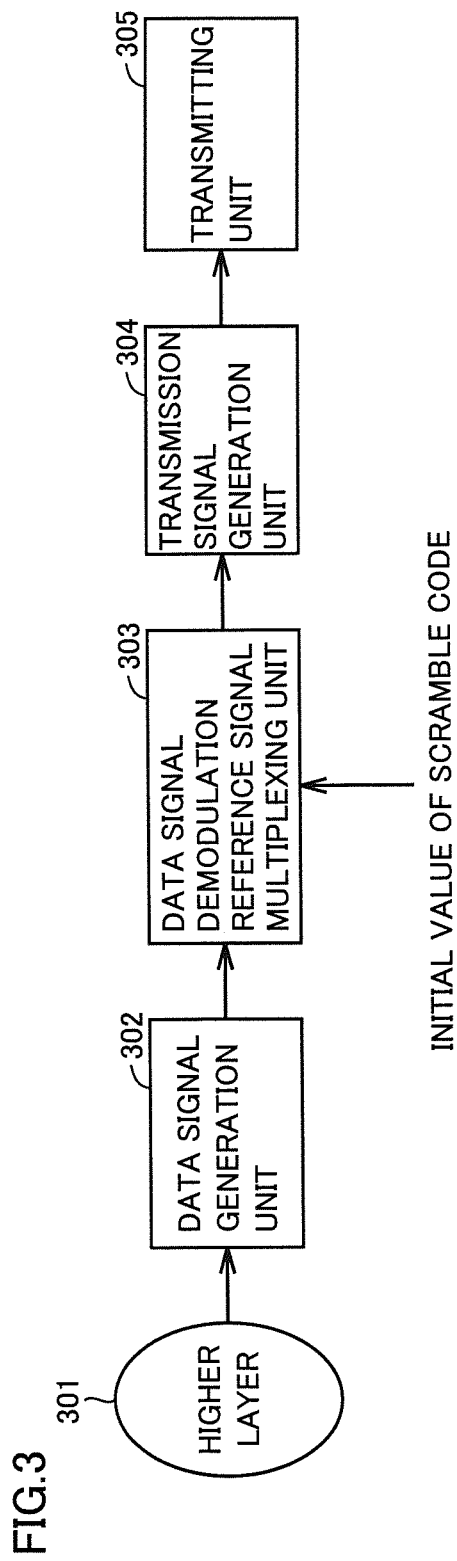
FIG. 3 is a schematic block diagram illustrating a configuration of a base station according to the first embodiment of the present invention.

FIG. 3 is a schematic block diagram illustrating a configuration of a base station according to the first embodiment of the present invention. Here, the base station illustrated in FIG. 3 includes the primary base station 101 and the secondary base station 102. In FIG. 3, the base station includes a higher layer 301, a data signal generation unit 302, a demodulation reference signal for a data signal multiplexing unit 303, a transmission signal generation unit 304, and a transmitting unit 305.

The higher layer 301 outputs information data for each terminal from the higher layer such as a data link layer. In this case, various pieces of control information (including adaptive control information, scheduling information, base station information, and terminal information) in the higher layer and a physical layer are shared inside a base station. In addition, various pieces of control information can be shared, through the line 103, between the primary base station 101 and the secondary base station 102 (also, between a plurality of primary base stations or between a plurality of secondary base stations).

The data signal generation unit 302 performs a scramble process, a code process, a modulation process, a layer mapping process, and the like on the input information data and generates data signals. In addition, the data signal generation unit 302 performs the scramble process, the code process, the modulation process, for each unit of information data called a code word. For example, the base station can transmit up to two code words to each terminal.

The demodulation reference signal for the data signal multiplexing unit 303 multiplexes demodulation reference signal for the data signal into the generated data signal. In this case, the demodulation reference signal for the data signal is subjected to a Code Division Multiplexing (CDM) and/or a Frequency Division Multiplexing (FDM), depending on the number of layers of the data signal (rank number and spatial multiplexing number). First, the demodulation reference signal for the data signal uses Walsh code of two chips or four chips as an orthogonal code for the CDM, depending on the number of layers. Further, a scramble code is superimposed on the used Walsh code. As the scramble code, a pseudo-random sequence by Gold codes and the like is used. Further, an initial value for generating the scramble code is given. For this reason, the initial value of the scramble code is input to the demodulation reference signal for the data signal multiplexing unit 303. The demodulation reference signal for the data signal multiplexing unit 303 generates a scramble code using the initial value of the input scramble code. The details of the demodulation reference signal for the data signal in the present embodiment will be described later.

The transmission signal generation unit 304 performs a precoding process for performing a phase rotation and/or a beam forming on the data signal and the demodulation reference signal for the data signal. Here, it is preferable that the precoding process perform a phase rotation on the generated signal such that the terminal efficiently performs reception (for example, reception power becomes maximum, interference from the adjacent cell is reduced, or interference to the adjacent cell is reduced). Further, the transmission signal generation unit 304 can use transmission diversity such as a process by a predetermined precoding matrix, and a Cyclic Delay Diversity (CDD).

Further, after the precoding process, the transmission signal generation unit 304 maps the precoded signals into a predetermined resource block (resource element), using a Physical Downlink Shared Channel (PDSCH), based on the scheduling information determined by the base station. Further, the transmission signal generation unit 304 generates a control signal for notifying control information to the terminal, and maps the control signal to a predetermined resource element, using the Physical Downlink Control Channel (PDCCH). The details of the control signal in the present embodiment will be described later.

The transmitting unit 305 performs an Inverse Fast Fourier Transform (IFFT) and an addition of a guard interval on the data signal, the control signal and/or the demodulation reference signal for the data signal that are mapped, and then transmits the signals from transmission antennas of at least one transmitting antenna number (transmitting antenna port number).

Figure 4:
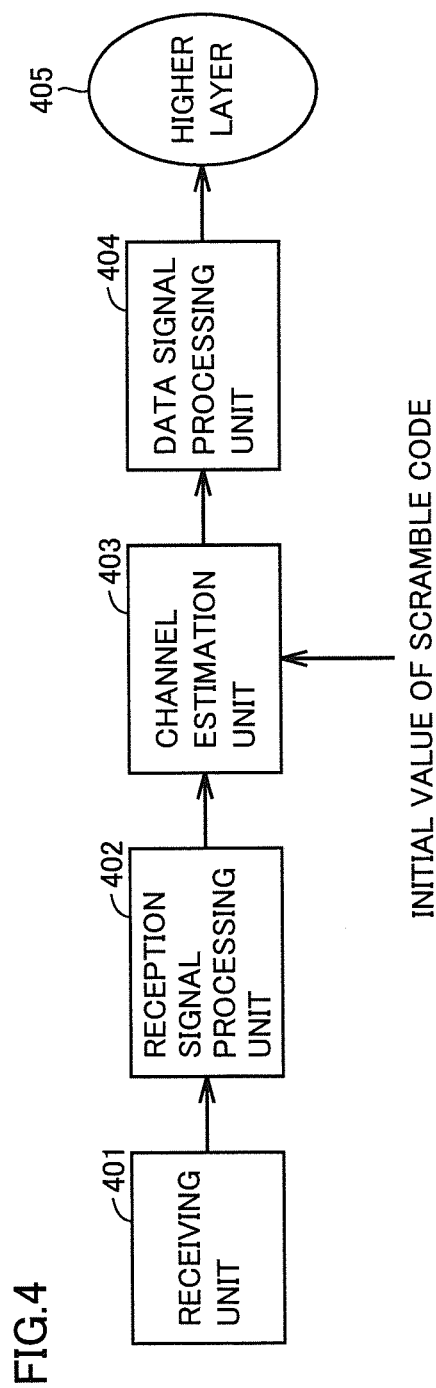
FIG. 4 is a schematic block diagram illustrating a configuration of a terminal according to the first embodiment of the present invention.

FIG. 4 is a schematic block diagram illustrating a configuration of a terminal according to the first embodiment of the present invention. Here, the terminal illustrated in FIG. 4 includes the terminal 104, the terminal 204, and the terminal 205. In FIG. 4, the terminal includes a receiving unit 401, a reception signal processing unit 402, a channel estimation unit 403, a data signal processing unit 404, and a higher layer 405.

The receiving unit 401 receives signals transmitted by the base station using the multi-cell communication or the single cell communication, through the receiving antenna of at least one receiving antenna number (receiving antenna port number).

The reception signal processing unit 402 eliminates the added guard interval from the signals received by the receiving unit 401. Further, the reception signal processing unit 402 performs a time-frequency transform process such as Fast Fourier Transform (FFT) on the signal in which the guard interval is eliminated, so as to transform the signal to a signal in a frequency region. Further, the reception signal processing unit 402 performs a de-mapping (separation) on the control signals, the data signals and the demodulation reference signal for the data signals, which are mapped by the base station. The reception signal processing unit 402 searches for control information addressed to its own terminal from the control signals and identifies the control information addressed to the own terminal. The control information is shared within the terminal and used in demodulation of the data signals and the like.

The channel estimation unit 403 estimates the channel state for demodulating the data signal using the demodulation reference signal for the data signal. Here, an initial value of the scramble code used in the base station is input to the channel estimation unit 403. The scramble code is generated based on the initial value, and a de-scramble process is performed on the demodulation reference signal for the data signal. A de-spread process is performed on the demodulation reference signal for the data signal subjected to the de-scramble process with respect to a Walsh code of two chips or four chips, depending on the number of layers of the data signal, and thus a channel estimation value is generated. Here, a notification method of the initial value of the scramble code used in the base station will be described later.

The channel estimation process estimates (channel estimation) variations in amplitude and phase (frequency response and transfer function) in each resource element for each layer (rank and spatial multiplexing), and calculates a channel estimation value. Further, the resource element, in which the demodulation reference signal for the data signal is not mapped, performs channel estimation by performing an interpolation in a frequency direction and in a time direction, based on the resource element in which the demodulation reference signal for the data signal is mapped.

The data signal processing unit 404 performs a compensation process (filter process) for the channel variation, based on an input data signal and an estimated channel estimation value. The data signal processing unit 404 performs a layer de-mapping process, a demodulation process, a de-scramble process, a decoding process, and the like on the data signal subjected to the channel compensation process, based on identified control information. The data signal, on which each process is performed, is output to the higher layer 405. In the channel compensation process, channel estimation is performed on the input data signal using the estimated channel estimation value, and the data signal is detected (restoration) for each layer. In the detection method, it is possible to use equalization, interference cancellation, or the like of Zero Forcing (ZF) criterion or Minimum Mean Square Error (MMSE) criterion. In the layer de-mapping process, the signal for each layer is de-mapped into each code word. Subsequently, the process is performed for each code word. In the demodulation process, demodulation is performed based on the used modulation method. In the de-scramble process, the de-scramble process is performed based on the used scramble code. In the decoding process, an error correction decoding process is performed based on the performed coding method.

Figure 5:
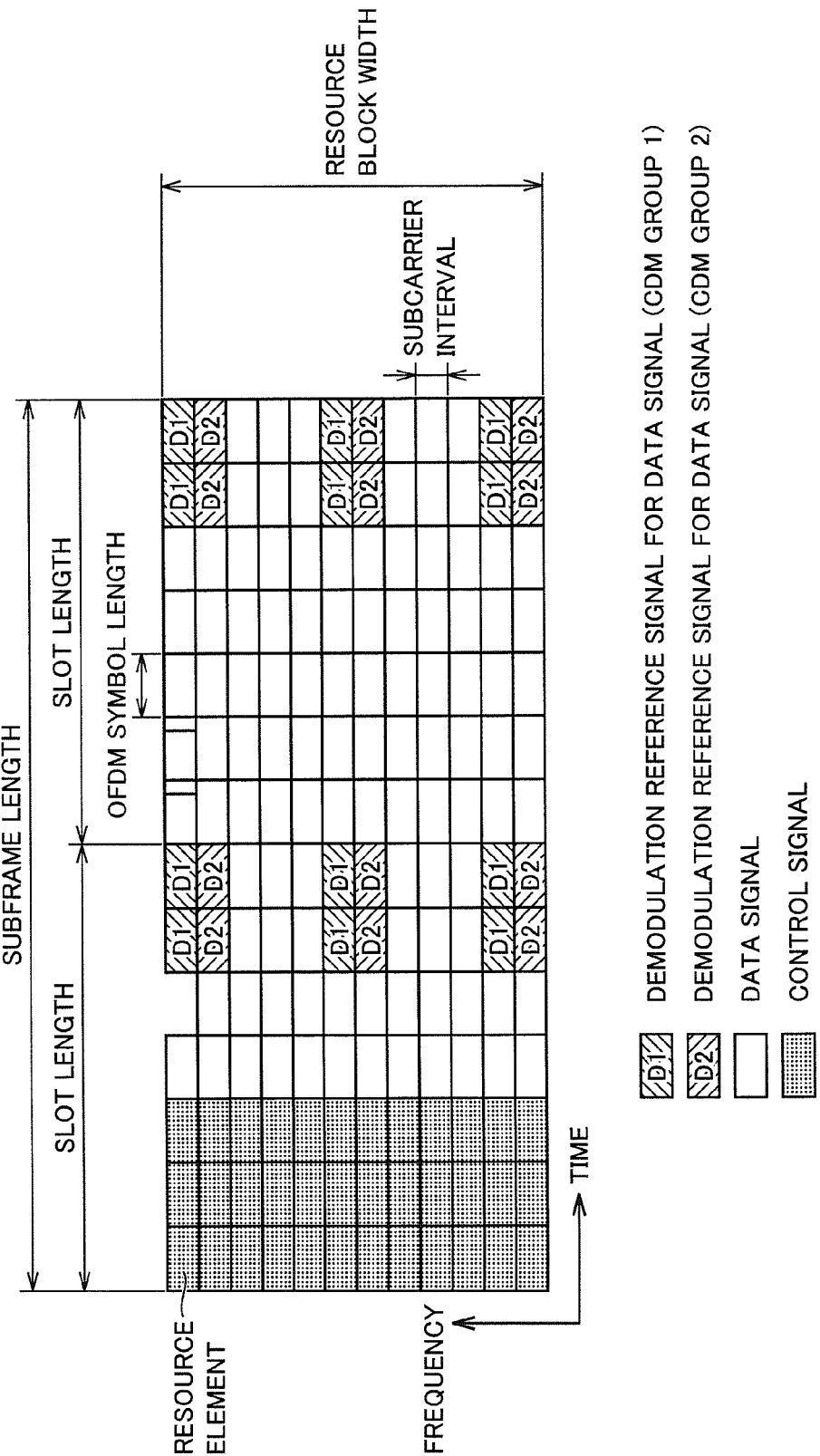
FIG. 5 is a diagram illustrating an example of a signal mapped by the base station.

FIG. 5 is a diagram illustrating an example of a signal mapped by the base station. FIG. 5 illustrates one resource block pair in which the demodulation reference signal for the data signal, the data signal and the control signal are mapped. Further, FIG. 5 illustrates two resource blocks within one sub-frame. One resource block is configured by twelve sub-carriers in the frequency direction and seven OFDM symbols in the time direction. Each sub-carrier out of one OFDM symbol is referred to as a resource element. Out of each sub frame, seven OFDM symbols before and after in the time direction are respectively referred to as a slot. Two continuous resource blocks contained in one sub-frame is referred to as a resource block pair.

Here, the number of resource blocks may vary depending on a frequency bandwidth (system bandwidth) used by the communication system. For example, it is possible to use resource blocks of 6 to 110, and these resource blocks are called component carriers as units. Further, it is possible to make a bandwidth of an entire system to 110 or more, by a frequency aggregation. In other word, it is possible to configure up to five continuous or non-continuous component carriers. Further, the terminal may set the component carriers of the primary base station 101 and the component carriers of the secondary base station as a frequency aggregation.

In FIG. 5, the first three OFDM symbols are set to a PDCCH region, and the control signal is mapped into the resource element in the PDCCH region. The demodulation reference signal for the data signals are mapped into the resource elements shaded with diagonal lines. The demodulation reference signal for the data signals are mapped such that the resource element varies depending on the unit of CDM. The data signals are mapped into the resource elements filled with white. Further, reference signals for measuring channel state (including Channel State Information-RS (CSI-RS) and zero power (muting)), reference signals specific to cells (CRS; Cell-specific RS), and the like may be mapped into the resource elements illustrated in FIG. 5.

Hereinafter, the details of the demodulation reference signal for the data signal will be described. In the demodulation reference signal for the data signal, an orthogonal code using Walsh code is first mapped, and then a scramble code using Gold code is superimposed.

Figures 6, 7:
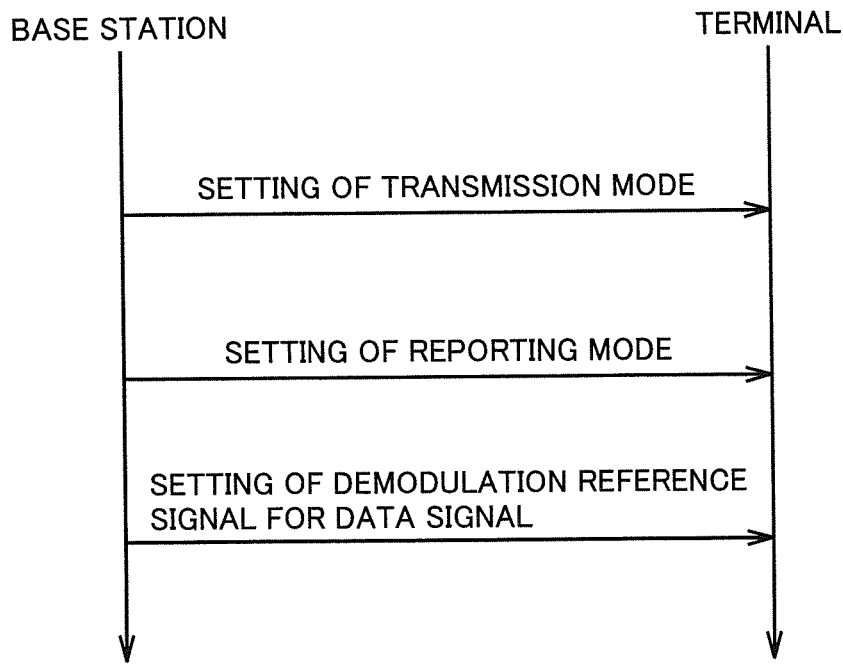
FIG. 6 is a diagram illustrating an orthogonal code for an antenna port in a demodulation reference signal for a data signal.
FIG. 7 is a diagram illustrating an example of a method of notifying control information with respect to the terminal, by the base station.

FIG. 6 is a diagram illustrating an orthogonal code for an antenna port in a demodulation reference signal for a data signal. In FIG. 6, the antenna port number is defined as 7 to 14. Further, the maximum number of layers is set to 8. The antenna port number to be used varies depending on the number of layers. Specifically, in a case where the number of layers is 8, the antenna ports 7 to 14 are used. In a case where the number of layers is less than 8, a part of the antenna ports 7 to 14 is used. For example, in a case where the number of layers is 4, the antenna ports 7 to 10 are used, whereas in a case where the number of layers is 1, any one of the antenna ports 7 and 8 are used.

Further, the demodulation reference signal for the data signal can change the number of resource elements to be mapped or the sequence to be mapped, depending on the number of layers of the data signal to be superimposed. In a case where the number of layers is 1 to 2, orthogonal codes of two chips are mapped into the resource elements of a CDM group 1 denoted as D1. In a case where the number of layers is 3 to 4, orthogonal codes of two chips are mapped into the resource elements of a CDM group 2 denoted as D2, in addition to the mapped orthogonal codes in a case where the number of layers is 1 to 2. In a case where the number of layers is 5 to 8, orthogonal codes of four chips are mapped into the resource elements of the CDM group 1 denoted as D1 and the CDM group 2 denoted as D2.

Subsequently, the scramble code is superimposed on the demodulation reference signal for the data signal. Further, for the scramble code, the same sequence is used in each antenna port. The scramble code is given by the sequence r(m) defined by a following equation.

[Equation 1]

$$r(m) = \frac{1}{\sqrt{2}}(1 - 2 \cdot c(2m)) + j\frac{1}{\sqrt{2}}(1 - 2 \cdot c(2m+1)), \quad (1)$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

Here, $N_{RB}^{max,DL}$ refers to the maximum number of resource blocks, and for example, may be 110.

Further, c(n) is a Gold code, and is defined by a following equation.

[Equation 2]

$$c(n) = (x_1(n+N_c) + x_2(n+N_c)) \bmod 2\ x_1 = (n+31) = (x_1(n+3) + x_1(n)) \bmod 2\ x_2 = (n+31) = (x_2(n+3) + x_2(n+2) + x_2(n+1) + x_2(n)) \bmod 2 \quad (2)$$

Here, $N_c$ is an integer, for example, may be 1600.

Further, the initial value of a first M-sequence is defined by a following equation.

[Equation 3]

$$x_1(0) = 1, x_1(n) = 0, n = 1, 2, \ldots, 30 \quad (3)$$

Further, the initial value of a second M-sequence is defined by a following equation.

[Equation 4]

$$c_{init} = \sum_{i=0}^{30} x_2(i) \cdot 2^i \quad (4)$$

[Equation 5]

$$c_{init} = (\lfloor n_s/2 \rfloor + 1) \cdot (2N_{ID}^{cell} + 1) \cdot 2^{16} + n_{SCID} \quad (5)$$

Here, $n_s$ is the slot number in a wireless frame. $N_{ID}^{cell}$ is a cell Identity (ID) and is the number specific to the base station (cell).

Here, the primary base station and the secondary base station included in the heterogeneous network configuration may set cell IDs that are different form each other (different cell ID). Further, all or a part of the primary base station and the secondary base station included in the heterogeneous network configuration may set the same cell ID (Shared cell ID and Same cell ID).

Further, $n_{SCID}$ is a scramble Identity (ID) and is set by a PDCCH signaling or a Radio Resource Control (RRC) signaling. Further, the scramble ID may be defined in advance depending on the number of layers to be set. Here, the PDCCH signaling is control information to be adaptively notified to the terminal through a physical layer, and is notified to the terminal through PDCCH. The RRC signaling is control information to be quasi-statically notified to the terminal through a further higher layer (RRC layer) than the physical layer, and is notified to the terminal through PDCCH. Further, the control information by the PDCCH signaling may be notified in a shorter period than that of the control information by the RRC signaling. Further, each signaling may be control information to be notified in each different period through the same channel. Further, the $n_{SCID}$ is also referred to as a first scramble ID. Further, the control signal to be notified by the PDCCH signaling is referred to as a first control signal, and the control signal to be notified by the RRC signaling is referred to as a second control signal.

Hereinafter, a description will be made of the control information to be set with respect to the terminal by the base station, in the present invention. FIG. 7 is a diagram illustrating an example of a method of notifying control information with respect to the terminal, by the base station.

The base station sets a transmission mode with respect to the terminal by the RRC signaling. In the transmission mode of the present invention, the base station can perform the single cell communication and/or the multi-cell communication, with respect to the terminal. For example, the transmission mode is defined as new transmission modes (transmission mode 10 and a second transmission mode) different from the transmission mode (first transmission mode) of the related art that is defined in the communication system with backward compatibility.

Here, the first transmission mode is all or a part of one or a plurality of transmission modes that are defined in the related art. For example, the first transmission mode is defined as transmission modes 1 to 9. The transmission mode 1 is a transmission mode using the single antenna port transmission scheme using the antenna port 0. The transmission mode 2 is a transmission mode using the transmission diversity scheme. The transmission mode 3 is a transmission mode using a cyclic delay diversity scheme. The transmission mode 4 is a transmission mode using a closed-loop spatial multiplexing scheme. The transmission mode 5 is a transmission mode using a multi-user MIMO scheme. The transmission mode 6 is a transmission mode using the closed-loop spatial multiplexing scheme using a single antenna port. The transmission mode 7 is a transmission mode using the single antenna port transmission scheme using the antenna port 5. The transmission mode 8 is a transmission mode using the closed-loop spatial multiplexing scheme using the antenna ports 7 to 8. The transmission mode 9 is a transmission mode using the closed-loop spatial multiplexing scheme using the antenna ports 7 to 14.

Further, the second transmission mode is defined as a transmission mode that is different from the first transmission mode, and is defined as, for example, a transmission mode 10. For example, the transmission mode 10 may be set to the transmission mode using the multi-cell communication scheme. Further, the transmission mode 10 may be set to a transmission mode using the multi-cell communication scheme, in addition to all or a part of communication schemes indicated by the transmission modes 1 to 9. For example, the transmission mode 10 may be set to the transmission mode using the multi-cell communication scheme, in addition to the communication scheme indicated by the transmission mode 9. Further, the transmission mode 10 may be set to the transmission mode capable of setting a plurality of reference signals for measuring channel state. Further, when the base station transmits data signals to the terminal that is set to the transmission mode 10 capable of using a plurality of transmission schemes, the base station can perform a communication even without notifying a used transmission scheme out of a plurality of transmission schemes. In other words, even if the terminal is set to the transmission mode 10 capable of using a plurality of transmission schemes, the base station can perform a communication even without notifying a used transmission scheme out of a plurality of transmission schemes, when receiving the data signals.

Subsequently, the base station sets a reporting mode by the RRC signaling with respect to the terminal. The reporting mode in the present invention is a method of notifying feedback information (reporting information) to the base station, in order to perform an adaptive control in a downlink, with respect to the terminal. Further, the reporting mode is defined corresponding to a transmission mode. Further, the reporting mode may be set for each base station (for each CSI-RS to be set), and may be set to all or a part of a plurality of base stations to be set. Further, the setting of the reporting mode may be performed simultaneously with the setting of the transmission mode.

Here, a description will be made of a case where feedback information is recommendation transmission format information for the base station. It is assumed that in the feedback information, a transmission format known both in the base station and the terminal is indexed in advance. The terminal feeds back information using the transmission format. The base station performs an adaptive control using the information. Specifically, since Channel Quality Indicator (CQI) is information indicating a coding rate and a modulation scheme, the base station may control each of a coding process and a modulation process. Since Precoding Matrix Index (PMI) is information indicating a precoding matrix, the base station may control a precoding process. Since Rank Indicator (RI) is information indicating the number of layers, the base station may control a layer mapping process and control the higher layer which generates a code word. Further, in a case where feedback information regarding a mapping to a resource is included in the feedback information, the base station may control the resource element mapping process. Further, the terminal notifies feedback information for performing a multi-cell communication (feedback information to be generated based on a plurality of base stations (CSI-RS to be set)). For example, phase difference information between a plurality of base stations, and RI, PMI, CQI, and the like that are suitable for the multi-cell communication are notified.

Further, the base station sets the demodulation reference signal for the data signal by the PDCCH signaling with respect to the terminal. Specifically, an initial value for generating a scramble code constituting a demodulation reference signal for a data signal is set. Here, the control information, that is set through the PDCCH signaling, is defined by Downlink Control Information (DCI) format. For example, the DCI format is defined by a new DCI format (DCI format 2D, second format) that is different from the DCI format (first format) of the related art in a communication system with backward compatibility. That is, the base station notifies the terminal of control information for setting the initial value for generating the scramble code constituting the demodulation reference signal for the data signal, by using DCI format 2D.

Further, the DCI format may be implicitly determined by the set transmission mode. For example, the terminal, in which the transmission mode of the related art is set, recognizes that the DCI format notified from the base station is the DCI format of the related art, and detects control information addressed to its own terminal, from the control signal from the base station. Further, the terminal, in which the transmission mode 10 is set, recognizes that the DCI format notified from the base station is DCI format 2D, and detects control information addressed to its own terminal, from control signal from the base station.

Hereinafter, a description will be made of the details of a notification method of the control information for setting the initial value for generating the scramble code constituting the demodulation reference signal for the data signal.

FIG. 8 is an example of control information for setting a demodulation reference signal for a data signal by one code word. In FIG. 8, the rank number, a transmission antenna port number, and a scramble ID are notified using eight states (state 0 to state 7) realized by 3 bits. For example, the state 0 indicates that the rank number is 1, the transmission antenna port number is 7, and the scramble ID is 0. The state 5 indicates that the rank number is 2, the transmission antenna port numbers are 7 to 8, and the scramble ID is 1.

The state 7 indicates that the rank number is 4 and the transmission antenna port numbers are 7 to 10. Further, in the state 6 and the state 7, the scramble ID is defined in advance, and for example, the scramble ID is set to 0. Further, the scramble IDs may be notified by the RRC signaling.

Further, the control information shown in FIG. 8 may be configured to be compatible with the control information used in the system in the related art. For example, in a case where the control information used in the system of the related art includes a state of Reserved, a new state may be replaced with the state of Reserved. In other words, the state 5 being a new state, shown in FIG. 8, (the rank number is 2, the transmission antenna port numbers are 7 to 8, and the scramble ID is 1) may be replaced with the state of Reserved.

Further, the control information shown in FIG. 8 may be configured such that the scramble ID to be notified is set to X and X uses the scramble ID that has been notified in the RRC signaling. For example, X may be set to any one of 0 to 15 by the RRC signaling. For example, X may be set in the control information in addition to that the scramble ID is 0 and 1. Further, instead of that the scramble ID is any one of 0 and 1, X may be set in the control information. Further, instead of that the scramble ID is 0 and 1, $X_0$ and $X_1$ may be set in the control information.

By using the control information shown in FIG. 8, the base station may efficiently set a communication of which the rank number is up to 4 and a communication of which the rank number that can be set by the scramble ID is up to 2, with respect to the terminal. Further, these communications may be set dynamically. For example, the base station may efficiently set a communication between SU-MIMO of which the rank number is up to 4 and MU-MIMO of which the rank number is up to 2, with respect to the terminal. Further, for example, the base station may efficiently set a single cell communication of which the rank number is up to 4 and a multi-cell communication of which the rank number is up to 2, with respect to the terminal.

FIG. 9 is another example of control information for setting a demodulation reference signal for a data signal by one code word. In FIG. 9, a rank number, a transmission antenna port number and a scramble ID are notified using 8 states (state 0 to state 7) to be realized by 3 bits. For example, the state 0 indicates that the rank number is 1, the transmission antenna port number is 7, and the scramble ID is 0. The state 3 indicates that the rank number is 1, the transmission antenna port number is 7, and the scramble ID is 3. The state 7 indicates that the rank number is 4, the transmission antenna port numbers are 7 to 10, and the scramble ID is 1.

Further, among the control information items shown in FIG. 9, the state 0 to state 5 may be configured such that the scramble IDs respectively indicate 0 to 2 in the transmission antenna port numbers of 7 and 8. For example, the states 0 to 2 indicate that the transmission antenna port number is 7 and the scramble IDs are respectively 0 to 2. The states 3 to 5 indicate that the transmission antenna port number is 8 and the scramble IDs are respectively 0 to 2.

Further, among the control information items shown in FIG. 9, the state 4 to state 7 may be configured such that the numbers of ranks respectively indicate 1 to 4. For example, the state 4 indicates that the rank number is 1 and the transmission antenna port number is 8. The states 5 to 7 respectively indicate that the numbers of ranks are 2 to 4. In this case, the scramble ID may be defined in advance, for example, the scramble ID is set to 0. Further, the scramble ID may be notified by the RRC signaling.

Further, the control information shown in FIG. 9 may be configured such that the scramble ID to be notified is set to X, and X uses the scramble ID that has been notified by the RRC signaling. For example, X may be set to any one of 0 to 15 by the RRC signaling. For example, in addition to that the scramble ID is 0 to 3, X may be added in the control information. Further, X may be set in the control information, instead of that the scramble ID is any one of 0 to 3. Further, $X_0$ to $X_3$ may be set in the control information instead of that the scramble ID is all or a part of 0 to 3.

By using the control information shown in FIG. 9, the base station may increase the number of scramble IDs that may be set with respect to the terminal. Hence, the base station may efficiently perform a scheduling. Further, in the control information shown in FIG. 9, the number of scramble IDs in the low rank number is set to be increased, and thereby the base station may efficiently notify the terminal of the control information.

FIG. 10 is an example of control information for setting a demodulation reference signal for a data signal by two code words. In FIG. 10, the rank number, a transmission antenna port number, and a scramble ID are notified using 8 states (state 0 to state 7) realized by 3 bits. For example, the state 0 indicates that the rank number is 2, the transmission antenna port number is 7 to 8, and the scramble ID is 0. The state 3 indicates that the rank number is 2, the transmission antenna port number is 7 to 8, and the scramble ID is 3. The state 7 indicates that the rank number is 4, the transmission antenna port number is 7 to 10, and the scramble ID is 1.

Further, among the control information items shown in FIG. 10, it is possible to respectively set the states indicated by the state 2 and the state 3 to Reserved, for the state to be used in a future system.

Further, the control information shown in FIG. 10 may be configured such that the scramble ID to be notified is set to X and X uses the scramble ID that has been notified by the RRC signaling. For example, X may be set to any one of 0 to 15 by the RRC signaling. For example, in addition to that the scramble ID is 0 to 3, X may be added to the control information. Further, X may be set in the control information instead of that the scramble ID is any one of 0 to 3. Further, $X_0$ to $X_3$ may be set in the control information instead of that the scramble ID is all or a part of 0 to 3.

By using the control information shown in FIG. 10, the base station may increase the number of scramble IDs that may be set with respect to the terminal. Hence, the base station may efficiently perform scheduling. Further, in the control information shown in FIG. 10, the number of scramble IDs in the low rank number is set to be increased, and thereby the base station may efficiently notify the terminal of the control information.

FIG. 11 is another example of control information for setting a demodulation reference signal for a data signal by two code words. In FIG. 11, the rank number, a transmission antenna port number, and a scramble ID are notified using 16 states (state 0 to state 15) realized by 4 bits. For example, state 0 indicates that the rank number is 2, the transmission antenna port number is 7 to 8, and the scramble ID is 0. The state 5 indicates that the rank number is 4, the transmission antenna port number is 7 to 10, and the scramble ID is 1. The states 6 to 9 respectively indicate that the rank number is 5 to 8. Further, the scramble ID in the states 6 to 9 may be respectively defined, and for example, the scramble ID is 0. Further, the scramble ID may be notified by the RRC signaling. The states 10 to 15 are respectively set to Reserved, for state used in a future system.

Further, the control information shown in FIG. 11 may be set to increase the number of scramble IDs in the low rank number, as the control information shown in FIG. 10.

Further, the control information shown in FIG. 11 may be configured such that the scramble ID to be notified is set to X, and X uses the scramble ID that has been notified by the RRC signaling. For example, X may be set to any one of 0 to 15 by the RRC signaling. For example, in addition to that the scramble ID is 0 and 1, X may be set in the control information. Further, X may be set in the control information instead of that the scramble ID is any one of 0 or 1. Further, $X_0$ and $X_1$ may be set in the control information instead of that the scramble ID is 0 and 1.

By using the control information shown in FIG. 11, the base station may efficiently set a communication of which the rank number is up to 8 and a communication of which the rank number that can be set by the scramble ID is up to 4, with respect to the terminal. Further, these communications may be set dynamically. For example, the base station may efficiently set a communication between SU-MIMO of which the rank number is up to 8 and MU-MIMO of which the rank number is up to 4, with respect to the terminal. Further, for example, the base station may efficiently set the single cell communication of which the rank number is up to 8 and the multi-cell communication of which the rank number is up to 4, with respect to the terminal.

Hereinafter, a description will be made of another notification method of control information for setting an initial value for generating the scramble code constituting the demodulation reference signal for the data signal. In the control information described in FIG. 8 to FIG. 11, a joint coding, that indicates a rank number, a transmission antenna port number, and a scramble ID in one state, is used. In the notification method, the scramble ID is configured as the control information that is different from and independent of the rank number and the transmission antenna port number. That is, the scramble ID by itself is configured as control information, and indicates, for example, any one of 0 to 3 by 2 bits. Further, the control information indicating the scramble ID may be set by the RRC signaling. Further, the control information indicating the scramble ID as the control information included in the DCI format 2D, may be set by the PDCCH signaling. Further, one or a plurality of states of the control information indicating the scramble ID may be configured to use the scramble ID notified by the RRC signaling. In the one or the plurality of states, for example, any one of 0 to 15 may be respectively set by the RRC signaling.

Hereinafter, a description will be made of another method of setting an initial value for generating the scramble code constituting the demodulation reference signal for the data signal. The initial value $c_{init}$ of a second M sequence used in the setting method is defined by the following equation.

[Equation 6]

$$c_{init}=(\lfloor n_s/2 \rfloor+1)\cdot(2N_{ID}^{cell}+1)\cdot 2^{16}+n_{SCID}+n_{XID} \qquad (6)$$

Here, $n_{XID}$ is a parameter notified from the base station to the terminal as control information, and is added to $c_{init}$ used in the system of the related art. The parameter $n_{XID}$ may be notified by the joint coding with other control information items, or may be notified as the control information alone. When the parameter $n_{XID}$ is notified by the joint coding with other control information items, the parameter $n_{XID}$ is subjected to the joint coding with, for example, control information such as the rank number, the transmission antenna port number, and the scramble ID. Further, in a case where the parameter $n_{XID}$ is notified as the control information alone, the parameter $n_{XID}$ indicates, for example, any one of 0 to 3 by 2 bits. Further, the control information indicating the parameter $n_{XID}$ may be set by the RRC signaling. Further, the control information indicating the parameter $n_{XID}$ may be set as the control information included in the DCI format 2D by the PDCCH signaling. Further, one or a plurality of states of the control information indicating the parameter $n_{XID}$ may be configured to use the scramble ID notified by the RRC signaling. For example, any one of 0 to 15 may be respectively set by the RRC signaling. Further, $n_{SCID}$ is referred to as a first scramble ID and $n_{XID}$ is referred to as a second scramble ID.

Further, the scramble ID or the parameter $n_{XID}$ may be implicitly determined by other control information items and the like. For example, the scramble ID or the parameter $n_{XID}$ is implicitly determined by a local cell ID to be set different from the cell ID. Here, the local cell ID is a parameter specific to the macro cell and the RRH, and is set for each cell or each the CSI-RS. Further, the scramble ID or the parameter $n_{XID}$ is implicitly determined by the CSI-RS, and is determined for example, by the control information (index) for setting the CSI-RS. Further, the scramble ID or the parameter $n_{XID}$ is implicitly determined by the number ($n_{RNTI}$) specific to a UE. The scramble ID or the parameter $N_{XID}$ is implicitly determined by other control information items and the like, thereby the base station may perform an efficient scheduling while reducing the overhead of the control information with respect to the terminal.

As described above, by using the method described in the present embodiment, the base station efficiently notifies control information to the terminal, and can increase the types of the scramble code constituting the demodulation reference signal for the data signal. Therefore, the base station can efficiently perform the scheduling or the adaptive control with respect to the terminal, thereby it is possible to improve the transmission efficiency.

Further, in a case where the same cell ID is set in all or a part of the primary base station and the secondary base station included in the heterogeneous network configuration, by using the method described in the present embodiment, all or a part of the primary base station and the secondary base station can reduce interference the demodulation reference signal for the data signal assigned with respect to respective different terminals. Accordingly, all or a part of the primary base station and the secondary base station can efficiently perform a data communication using the same resource with respect to respective different terminals.

Further, in a case where respective different cell IDs are set in all or a part of the primary base station and the secondary base station included in the heterogeneous network configuration, by using the method described in the present embodiment, all or a part of the primary base station and the secondary base station can efficiently perform the scheduling or the adaptive control with respect to the terminal, thereby it is possible to improve the transmission efficiency.

[Second Embodiment]

Hereinafter, a second embodiment of the present invention will be described. The control information used in a communication system in the second embodiment is notified by the signaling using a resource of a part of the PDSCH region, in addition to the signaling using the resource of the PDCCH region described in the first embodiment. The communication system in the second embodiment is the same as the communication system in the first embodiment. Hereinafter, the part described in the first embodiment will be described.

Figure 12:
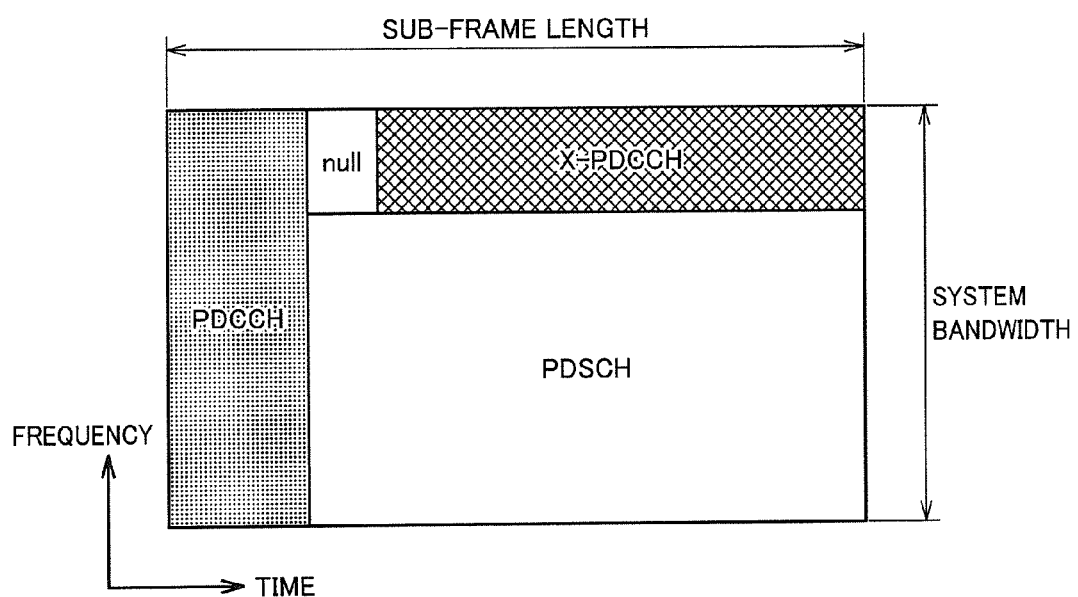
FIG. 12 is a diagram illustrating an example of a resource in a downlink according to a second embodiment of the present invention.
Figure 13:
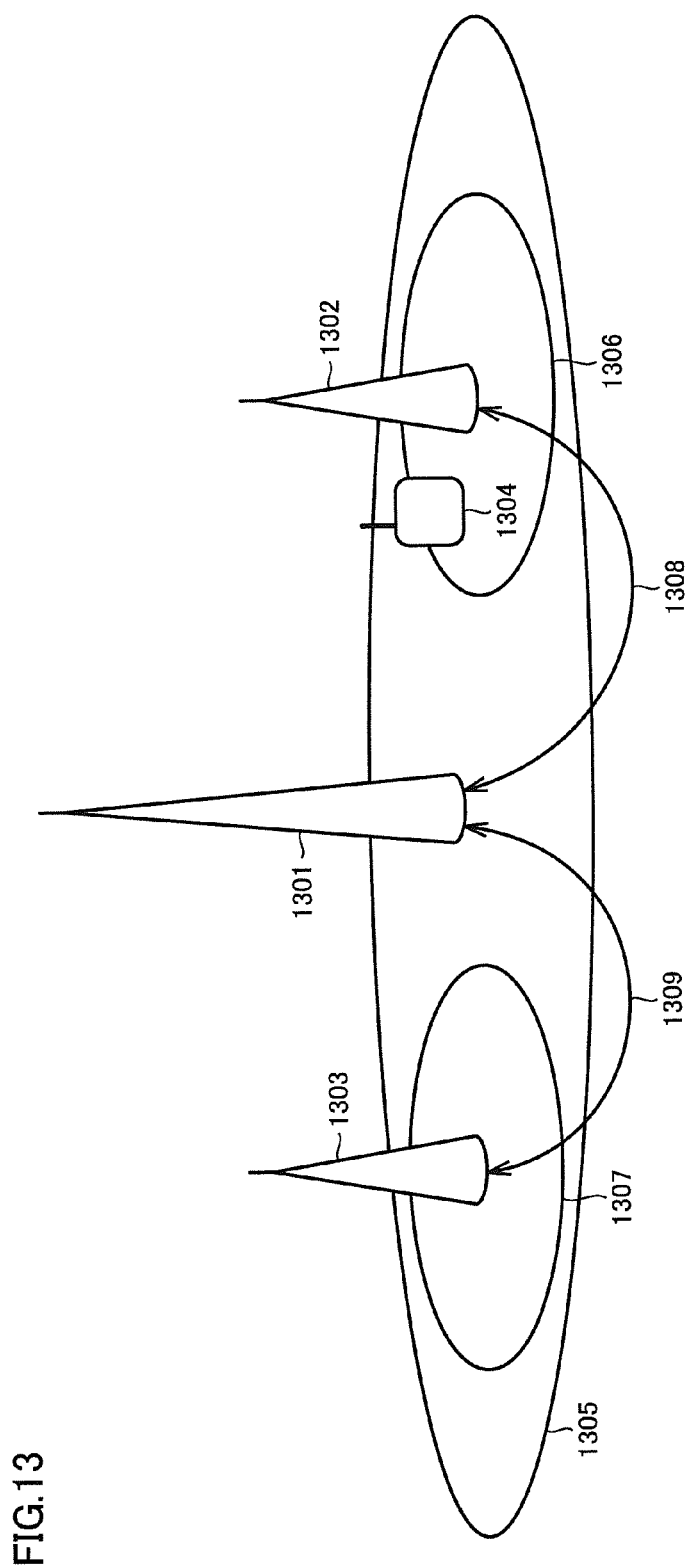
FIG. 13 is a schematic diagram of the wireless communication system using the heterogeneous network configuration.

FIG. 12 is a diagram illustrating an example of a resource in a downlink according to a second embodiment of the present invention. In the resource shown in FIG. 12, in addition to the PDCCH and the PDSCH of the resource described in the first embodiment, a part of the PDSCH region is set to X-PDCCH, and a region for notifying control information is added. The region of the X-PDCCH in the frequency direction is assigned to a region of resource block of a predetermined number. The region of the X-PDCCH in the time direction is determined by the start position of OFDM symbol within the sub-frame. The start position of the X-PDCCH is defined in advance, and for example, is defined as the fourth OFDM symbol within the sub-frame. Further, the start position of the X-PDCCH is notified by the RRC signaling of the base station, and set quasi-statically. Further, in a case where the PDCCH is configured by the first and second OFDM symbols, the start position of the X-PDCCH is the fourth OFDM symbol, and the third OFDM symbol in the resource block width constituting the X-PDCCH is set to null. Further, another control signal may be assigned to the region that is set to null.

Further, in a case where the start position of the X-PDCCH is included in the PDCCH region, the base station can set the start position of the X-PDCCH not to be included in the PDCCH region, with respect to the sub-frame. Further, in a case where the start position of the X-PDCCH is included in the PDCCH region, the terminal recognizes that the start position of the X-PDCCH is set not to be included in the PDCCH region, with respect to the sub-frame. Therefore, it is possible to realize an efficient data communication without increasing the overhead of the control information.

Further, a control signal with respect to the terminal that is set to a predetermined transmission mode (for example, a transmission mode 10 or a second transmission mode) is mapped into the X-PDCCH. The terminal set to the predetermined transmission mode detects an own control signal from the X-PDCCH region. Further, the base station may notify control information with respect to the plurality of terminals through the X-PDCCH. Further, the base station notifies whether there is the control information with respect to the terminal that is set to a predetermined transmission mode in the X-PDCCH region, by the PDCCH signaling or the RRC signaling. Further, the control signal notified in the X-PDCCH is configured by the same as the DCI format (DCI format 2D) described in the first embodiment of the present invention. Further, the control signal notified in the X-PDCCH is configured by the format (for example, DCI format 2E) different from the DCI format described in the first embodiment of the present invention. Further, the control signal notified in the X-PDCCH is also referred to as a third control signal.

The demodulation reference signal for the data signal described in the first embodiment of the present invention is assigned to the resource block including the X-PDCCH region, in the same manner. In other words, the base station notifies the scramble code constituting the demodulation reference signal for the data signal by the PDCCH signaling or the RRC signaling, to the terminal. The notification method can use the method described in the first embodiment of the present invention.

As described above, by using the method described in the present embodiment, the base station can increase a region from which the control information can be notified to the terminal. Further, the base station can efficiently transmit control information and increase the types of the scramble code constituting the demodulation reference signal for the data signal, with respect to the terminal. Therefore, the base station can efficiently perform the scheduling or the adaptive control with respect to the terminal, thereby it is possible to improve the transmission efficiency.

Further, in a case where the same cell ID is set in all or a part of the primary base station and the secondary base station included in the heterogeneous network configuration, by using the method described in the present embodiment, all or a part of the primary base station and the secondary base station can increase a region from which the control information can be notified to the terminal. Hence, all or a part of the primary base station and the secondary base station can reduce interference of demodulation reference signal for the data signal assigned to respective different terminals. Therefore, all or a part of the primary base station and the secondary base station can efficiently perform a data communication using the same resource to respective different terminals.

Further, in a case where respective different cell IDs are set in all or a part of the primary base station and the secondary base station included in the heterogeneous network configuration, by using the method described in the present embodiment, all or a part of the primary base station and the secondary base station can increase a region from which the control information can be notified to the terminal. Hence, all or a part of the primary base station and the secondary base station included in the heterogeneous network configuration can efficiently perform the scheduling or the adaptive control, with respect to the terminal, and thus it is possible to improve the transmission efficiency.

Further, the above each embodiment can use information indicating a channel state, as feedback information. The terminal feeds back the information of the channel state with the base station, using the demodulation reference signal for measuring channel state from the base station. At this time, the information indicating the channel state may be reduced in information amount, by using various methods such as an eigenvalue decomposition and a quantization. The base station performs a control with respect to the terminal by using information of the channel state that is fed back. For example, the base station, based on the information that is fed back, can determine a coding rate, a modulation scheme, the number of layers, a precoding matrix such that the terminal can perform an optimal reception at the time of reception. Various methods can be used.

Further, in the above embodiment, even in a case where a data signal is transmitted by the multi-cell communication of the primary base station 101 and the secondary base station 102, each terminal can perform a reception process of the data signal, without recognizing that the secondary base station 102 performs a cooperative communication. In other words, even in a case of performing the multi-cell communication to the terminal 104, the primary base station 101 can use control information used when the single cell communication is performed. Specifically, in a case where the primary base station 101 and the secondary base station 102 transmit the same data signal to the terminal 104, the terminal 104 performs the same process as the case of single cell communication, on the control information notified from the primary base station, thereby performing a reception process without special processes.

Further, in the above each embodiment, a description is made of a case where the primary base station 101 and the secondary base station 102 cooperate to perform a communication. Needless to say, the base station referred to here may be a physical base station device in a cellular system, in addition thereto, but the primary base station 101 and the secondary base station 102 may be a pair (a first transmission device and a second transmission device) of transmission devices (including a relay device) that extends a cell and cooperate with each other, or a pair of transmission devices that cooperate while transmitting the demodulation reference signal for measuring channel state through different antenna ports (a first port and a second port), and thereby it is possible to achieve the same effect as that of each embodiment. For example, it is possible to assume that the primary base station 101 is a base station device in the cellular system, and the secondary base station 102 is a transmission device (for example, Remote Radio Unit (RRU), Remote Radio Equipment (RRE), and Distributed antenna) to be controlled by the primary base station 101, on the contrary, it is possible to assume that the secondary base station 102 is a base station device in the cellular system, and the primary base station 101 is a transmission device to be controlled by the secondary base station 102. Otherwise, both the primary base station 101 and the secondary base station 102 may be transmission devices to be controlled by the physical base station device in the cellular system.

Further, in above each embodiment, a description has been made of a case where the secondary base station 102 mainly approaches the primary base station 101 in the cooperative communication of the primary base station 101 and the secondary base station 102, but it is not limited thereto. For example, even in a case where all or a part of the communication area of the primary base station 101 and the communication area of the secondary base station 102 are overlapped, like a heterogeneous network, it is possible to achieve the same effect as that described in each embodiment. At this time, all or a part of component carriers (carrier frequencies) of each base station may be overlapped. Specifically, it may be applied to even a case where the primary base station 101 is set to a macro cell, the secondary base station 102 is set to the pico cell or the femto cell (Home eNodeB), and the communication area of the secondary base station 102 being smaller than the communication area of the macro cell is overlapped within the area of the primary base station 101.

Further, in each embodiment, it has been described that the resource element or the resource block is used as mapping units of the information data signal, the control information signal, the PDSCH, the PDCCH and the demodulation reference signal, and the sub-frame or the wireless frame is used as transmission unit in the time direction, but it is not limited thereto. For example, even if a region configured by a certain frequency and time and a time unit are used instead thereof, it is possible to achieve the same effect. Further, in each embodiment, the description has been made of a case where demodulation is performed using the RS subjected to the precoding process and the port equivalent to the layer of MIMO is used as a port corresponding to the RS subjected to the precoding process, but it is not limited thereto. In addition thereto, it is possible to achieve the same effect by applying the present invention to the port corresponding to reference signals that are different from each other. For example, not Precoded RS but Unprecoded RS may be used, and the port equivalent to an output end after the precoding process or the port equivalent to a physical antenna (or a combination of physical antennas) may be used as a port.

A program executed in the primary base station 101, the secondary base station 102 and the terminal 104 according to the present invention is a program (program causing a computer to function) that controls a CPU and the like in order to realize the functions of the above embodiments according to the present invention. Then, the information dealt in these devices is temporarily stored in a RAM at the time of the process, and then stored in various ROMs and a HDD. Modification or writing of the information is performed by being read out by the CPU as necessary. As a recording medium storing a program, any one of a semiconductor medium (for example, ROM, non-volatile memory card and the like), an optical recording medium (for example, DVD, MO, MD, CD, BD and the like), a magnetic recording medium (for example, a magnetic tape, a flexible disc, and the like) may be used. Further, the functions of the above embodiments are realized by executing a loaded program, and also, the functions of the above embodiments may be realized by commonly processing an operating system, other application programs, or the like based on the instruction of the program.

In addition, when a program is distributed in a market, the program may be distributed by being stored in a portable recording medium, or the program may be distributed by being transferred to a server computer connected through a network such as internet. In this case, the storage device of the server computer is included in the present invention. Further, all or a part of the primary base station 101, the secondary base station 102 and the terminal 104 in the above embodiments may be typically realized as a LSI that is an integrated circuit. Each of functional block of the primary base station 101, the secondary base station 102 and the terminal 104 may be made into a separate chip, or all or a part thereof may be integrated and made into a chip. Further, integrated circuit technology is not limited to LSI, but may be realized by a dedicated circuitry or a general purpose processor. Further, if an integrated circuit technology to replace LSI emerges with the advance of semiconductor technology, it is possible to use an integrated circuit according to the technology.

Although it has been described in detail with reference to the drawings according to exemplary embodiments of the present invention, the specific configurations are not limited to the exemplary embodiments, and other modifications without departing from the scope of the present invention are also included. Further, various modifications of the present invention are possible within the scope of the claims, and embodiments obtained by appropriately combining the technical means disclosed in respective different embodiments are included in the technical scope of the present invention. Further, a configuration, in which elements that are described in the above embodiments and represent the same effect are replaced with each other, is also included in the present invention.

INDUSTRIAL APPLICABILITY

The present invention is suitable for being used in a wireless base station device, a wireless terminal device, a wireless communication system and a wireless communication method.

REFERENCE SIGNS LIST

101 primary base station
102 secondary base station
103 line
104, 204, 205 terminal
105, 106, 206, 207 downlink
301, 405 higher layer
302 data signal generation unit
303 data signal demodulation reference signal multiplexing unit
304 transmission signal generation unit
305 transmitting unit
401 receiving unit
402 reception signal processing unit
403 channel estimation unit
404 data signal processing unit
1301 macro base station
1302, 1303 RRH
1304 terminal
1305, 1306, 1307 coverage
1308, 1309 line

The invention claimed is:

1. A base station apparatus which is configured to and/or programmed to communicate with a user equipment (UE), the base station apparatus comprising:
   a higher layer processor configured to and/or programmed to configure a plurality of values to the UE for UE-specific reference signal generation,
   a transmitter configured to and/or programmed to transmit control information on a physical downlink control channel and a UE-specific reference signal associated with a physical downlink shared channel, wherein
   a pseudo random sequence used for the UE-specific reference signal is based on at least a value which is one of the plurality of values and a scrambling identity which is given by the control information associated with the physical downlink shared channel, and
   the value is determined from the plurality of values on the basis of the scrambling identity.

2. The base station apparatus according to claim 1, wherein
   the value corresponds to the scrambling identity.

3. The base station apparatus according to claim 1, wherein
   the scrambling identity is given by a field of the control information.

4. A base station apparatus which is configured to and/or programmed to communicate with a user equipment (UE), the base station apparatus comprising:
   a transmitter configured to and/or programmed to transmit a demodulation reference signal associate with an x-physical downlink control channel, wherein
   a pseudo random sequence used for the demodulation reference signal is based on at least a value which is configured by higher layers and a predetermined scrambling identity,
   the predetermined scrambling identity is different from any of scrambling identities for a UE-specific reference signal associated with a physical downlink shared channel, the predetermined scrambling identity's value being different from 0 and being different from 1, and
   a starting OFDM symbol for x-physical downlink control channel is determined from a higher layer parameter.

5. A user equipment (UE) which is configured to and/or programmed to communicate with a base station apparatus, the UE comprising:
   a higher layer processor configured to and/or programmed to configured a plurality of values by the base station apparatus for UE-specific reference signal generation,
   a receiver configured to and/or programmed to receive control information on a physical downlink control channel and a UE-specific reference signal associated with a physical downlink shared channel, wherein a pseudo random sequence used for the UE-specific reference signal is based on at least a value which is one of the plurality of values and a scrambling identity which is given by the control information associated with the physical downlink shared channel, and the value is determined from the plurality of values on the basis of the scrambling identity.

6. The UE according to claim 5, wherein the value corresponds to the scrambling identity.

7. The UE according to claim 5, wherein the scrambling identity is given by a field of the control information.

8. A user equipment (UE) which is configured to and/or programmed to communicate with a base station apparatus, the UE comprising:

a receiver configured to and/or programmed to receive a demodulation reference signal associate with an x-physical downlink control channel, wherein a pseudo random sequence used for the demodulation reference signal is based on at least a value which is configured by higher layers and a predetermined scrambling identity, the predetermined scrambling identity is different from any of scrambling identities for a UE-specific reference signal associated with a physical downlink shared channel, the predetermined scrambling identity's value being different from 0 and different from 1, and a starting OFDM symbol for x-physical downlink control channel is determined from a higher layer parameter.

* * * * *